United States Patent
Hagmüller

(10) Patent No.: US 12,546,281 B1
(45) Date of Patent: *Feb. 10, 2026

(54) WAVE ENERGY CONVERTING DEVICE SYSTEM AND METHOD

(71) Applicant: AquaHarmonics Inc., West Linn, OR (US)

(72) Inventor: Alex W. Hagmüller, West Linn, OR (US)

(73) Assignee: AQUAHARMONICS, INC., West Linn, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/930,986

(22) Filed: Oct. 29, 2024

Related U.S. Application Data

(63) Continuation-in-part of application No. 18/238,720, filed on Aug. 28, 2023, now Pat. No. 12,129,821, which is a continuation of application No. 17/473,426, filed on Sep. 13, 2021, now Pat. No. 11,739,727.

(51) Int. Cl.
  *F03B 13/18* (2006.01)
  *F03B 13/10* (2006.01)

(52) U.S. Cl.
  CPC ............ *F03B 13/18* (2013.01); *F03B 13/10* (2013.01); *F05B 2220/707* (2013.01)

(58) Field of Classification Search
  CPC ..... F03B 13/18; F03B 13/10; F05B 2220/707

USPC ...................................................... 290/42, 53
See application file for complete search history.

(56) References Cited

U.S. PATENT DOCUMENTS

| | | | | |
|---|---|---|---|---|
| 1,045,654 A | * | 11/1912 | Willy | F03B 13/182 |
| | | | | 60/497 |
| 7,265,470 B1 | * | 9/2007 | Paden | H02K 49/106 |
| | | | | 310/156.43 |
| 2021/0054897 A1 | * | 2/2021 | Bird | F16F 6/005 |

OTHER PUBLICATIONS

RD 194011A, Mar. 1992.*

\* cited by examiner

*Primary Examiner* — Charles Reid, Jr.
(74) *Attorney, Agent, or Firm* — Bold IP, PLLC; Christopher Mayle

(57) ABSTRACT

A system and method for a for a wave energy converter device that is an axisymmetric point absorber which operates in a tension only condition over a large stroke that can operate in the given wave environment so as to eliminate the need for end stops in normal operation whereby the wave energy converter device has a floating hull with an interior Power Take Off (PTO) that uses an impedance control scheme for impedance matching with the wave environment in which it is deployed so as to maximize electrical power output as compared with a passively operating device of similar size.

4 Claims, 11 Drawing Sheets

WAVE ENERGY CONVERTING DEVICE SYSTEM AND METHOD

CROSS REFERENCE TO RELATED APPLICATIONS

This applications is a continuation in part of U.S. Ser. No. 18/238,720 filed on Aug. 28, 2023 which is a continuation of U.S. Ser. No. 17/473,426 which was filed on Sep. 13, 2021 which is incorporated in its entirety.

FIELD OF DISCLOSURE

The field of disclosure is generally directed to an energy converting device and more particularly to a wave energy converter that is an axisymmetric point absorber which operates in a tension only condition over a large stroke that can operate in the given wave environment so as to eliminate the need for end stops in normal operation.

BACKGROUND

Sea waves represent a potentially rich source of energy. Energy harvested from sea waves has many advantages over traditional energy sources. For example, energy harvested from sea waves does not generate pollutants such as carbon dioxide, carbon monoxide, sulfur oxides, oxides of nitrogen, and other pollutants that typically result from combustion processes. Additionally, energy harvested from sea waves does not result in dangerous radioactive waste, unlike current nuclear power generation systems. Furthermore, unlike many other sources of clean energy, energy can be harvested from sea waves in a relatively steady manner because of the consistency of sea waves which typically continue uninterrupted, day and night. Thus, sea waves have the potential to be a clean, safe, and continuous source of energy. Additionally, as the world transitions to renewable energy primarily with wind and solar, the more installed wave energy devices that exist for a given electrical grid, the less energy storage is needed to provide continuous uninterrupted power day and night, year round.

However, traditional sea wave energy harvesting systems and processes do not adequately capture energy from sea waves. For example, traditional sea wave energy harvesting systems and processes do not efficiently harvest energy from the entire cycle of a sea wave. Additionally, in spite of sea waves being relatively steady in the sense that sea waves do not typically entirely stop, the conditions of the sea waves are constantly changing. For example, the height of sea waves, the frequency of sea waves, and even the direction of sea waves are continuously in flux. Traditional sea wave energy harvesting systems are designed to harvest energy in a particular set of sea wave conditions, and have a narrow operating band. When sea wave conditions vary from the particular set of sea wave conditions for which the traditional sea wave energy harvesting systems are optimized, then traditional sea wave energy harvesting systems harvest energy in a highly inefficient manner, Thus, traditional sea wave energy harvesting systems and processes are expensive and inefficient, and have a low capacity factor. The result is that sea wave energy harvesting is underutilized due to the limitations of traditional sea wave energy harvesting systems and processes.

SUMMARY

The present invention is directed to a wave energy system including a power takeoff drum, a generator including a rotor rotationally coupled directly, or indirectly with a gear ratio to the power takeoff drum, a mooring belt coupled to a wave energy device; whereby the mooring belt terminates at the power takeoff drum at a first end, while an opposite end of the mooring belt is connected to a guided sliding termination assembly, which allows the mooring belt to terminate and pass loads through the guided sliding termination assembly to an electrical-optical-mechanical cable which is connected to the guided sliding termination assembly via a pass thru type connection, a control system controlling the generator to generate electricity during upward portions of sea wave cycles based on unwinding of the power takeoff drum in a first direction, and to control the generator to drive rotation of the power takeoff drum in a direction opposite to the first direction during downward portions of the sea wave cycles, forcing winding of the mooring belt, whereby the generator is a DC machine that operates as a generator and as a motor, whereby the wave energy device includes a power takeoff shaft coupled to the power takeoff drum and the generator such that rotation of the power takeoff drum causes rotation of the rotor, and rotation of the rotor causes rotation of the power takeoff drum, the wave energy system further including a pneumatic return spring assembly having a pneumatic return spring connecting to a spring return belt, which passes over a return drum and terminates at a spring return shaft, whereby the spring return shaft is connected to the power takeoff drum via a synchronous belt, whereby a second synchronous belt is connected in parallel with the pneumatic return spring assembly to the power takeoff drum, the wave energy system further including a braking system connected to the power takeoff drum, the braking system comprised of a braking disc, braking calipers, and braking pads, whereby the control system aligns a resonant frequency of the wave energy device with a frequency of sea waves by controlling the generator to apply a dynamic time varying torque to the power takeoff drum, whereby the power takeoff drum is a part of a power take off module that is bolted and sealed into a lower portion of a hull of the wave energy device, whereby the electrical-optical-mechanical cable passes through and is constrained laterally by a fairlead integrated into a lower spar section positioned below a hull structure, which then connects at standard dive depths to a buoyant electrical-optical-mechanical connection assembly, whereby the buoyant electrical-optical-mechanical connection assembly is connected to a second electrical-optical-mechanical cable, the second electrical-optical-mechanical cable connects to a device mooring anchor positioned on a sea floor, the second electrical-optical-mechanical cable connected to a subsea junction box the subsea junction box connected to an end user subsea cable, which then proceeds to a shore and a grid tie connection, or a standalone type condition, the guided sliding termination assembly having an attenuator, or emergency end stop, at a bottom, which passes loads from the electrical-optical-mechanical cable directly to the hull structure.

The present invention is also directed to a wave energy system including a mooring belt coupled to a wave energy device; whereby the mooring belt terminates at a power takeoff drum at a first end, the mooring belt coupled to the power takeoff drum such that the mooring belt winds and unwinds about the power takeoff drum as the wave energy device rises and falls with the waves; while an opposite end of the mooring belt is connected to a guided sliding termination assembly, the guided sliding termination assembly connected to an electrical-optical-mechanical cable which is connected to the guided sliding termination assembly via a pass thru type connection, whereby the electrical-optical-mechanical cable passes through and is constrained laterally by a fairlead integrated into a lower spar section positioned below a hull structure, which then connects at standard dive depths to a buoyant electrical-optical-mechanical connection assembly, whereby the buoyant electrical-optical-mechanical connection assembly is connected to a second electrical-optical-mechanical cable, the second electrical-optical-mechanical cable connects to a device mooring anchor positioned on a sea floor, the second electrical-optical-mechanical cable connected to a subsea junction box the subsea junction box connected to an end user subsea cable, which then proceeds to a shore and a grid tie connection, or a standalone type condition, the guided sliding termination assembly having an attenuator, or emergency end stop, at a bottom, which passes loads from the electrical-optical-mechanical cable directly to the hull structure, the wave energy system also including a control system controlling a generator to generate electricity during upward portions of sea wave cycles based on unwinding of the power takeoff drum in a first direction, and to control the generator to drive rotation of the power takeoff drum in a direction opposite to the first direction during downward portions of sea wave cycles, forcing winding of the mooring belt.

DESCRIPTION OF DRAWINGS

The present invention will be described by way of exemplary embodiments, but not limitations, illustrated in the accompanying drawings in which like references denote similar elements, and in which:

FIG. 7 is directed to an illustration of the direction conventions of the PTO mooring line in.

DETAILED DESCRIPTION

Figure 1:
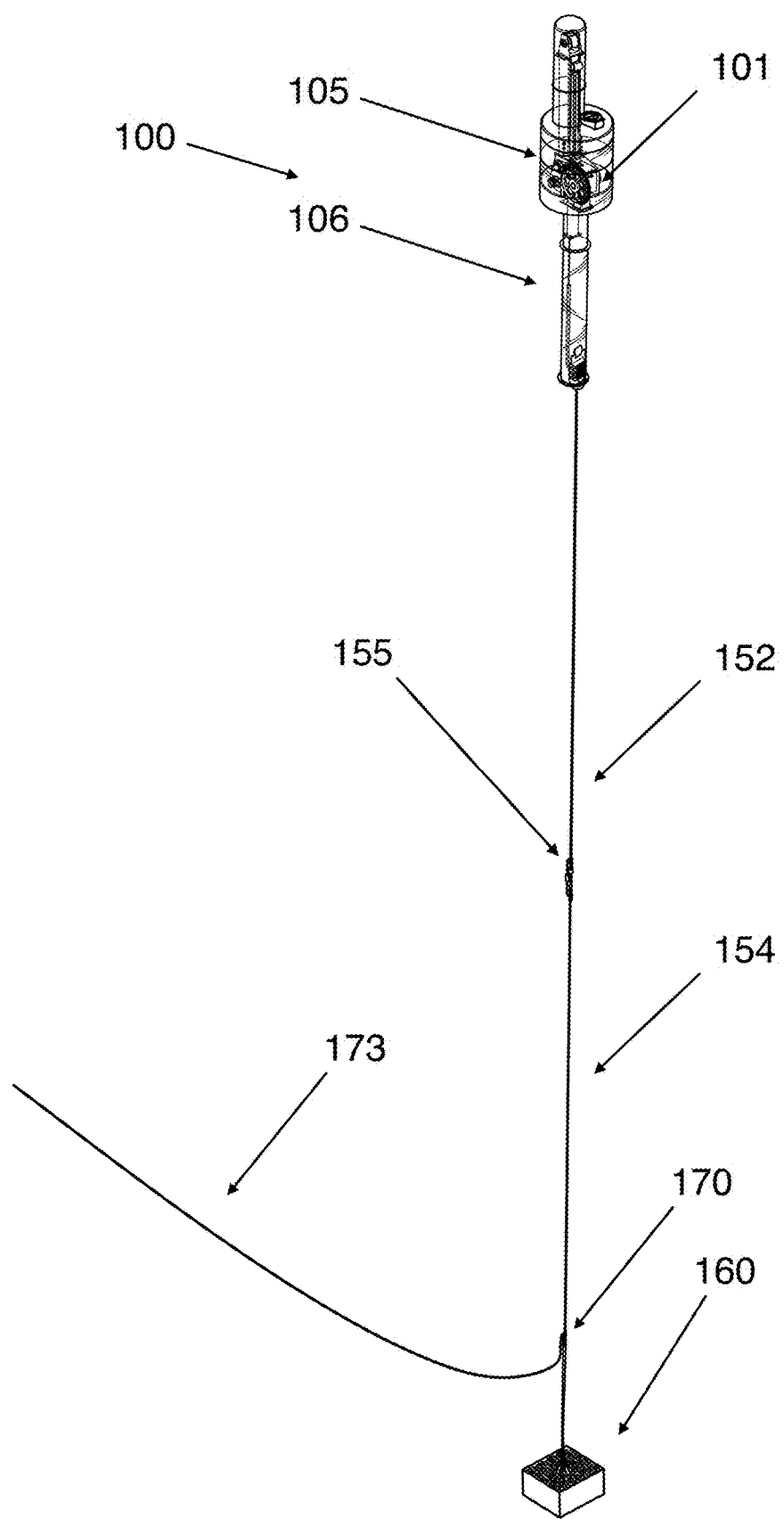
FIG. 1 is directed to an illustration of the wave energy converter device.

In the Summary above and in this Detailed Description, and the claims below, and in the accompanying drawings, reference is made to particular features of the invention. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure is generally drawn to a system and method, according to one or more exemplary embodiments, for a wave energy converter device that is an axisymmetric point absorber which operates in a tension only condition over a large stroke that can operate in the given wave environment so as to eliminate the need for end stops in normal operation. The device consists of a floating hull with an interior Power Take Off (PTO) that uses an impedance control scheme for impedance matching with the wave environment in which it is deployed so as to maximize electrical power output as compared with a passively operating device of similar size. Additionally, the PTO has a large hydraulic brake integrated into the assembly that may be used for latching type control, as well as a service brake for on-site repairs of the device and PTO.

Wave energy system 100 dynamically utilizes a generator as both a generator and as a motor. When wave energy system 100 uses the generator to generate electricity, wave energy system 100 generates energy from the generator. When wave energy system 100 uses the generator as a motor, wave energy system 100 applies energy to the motor, causing the power takeoff drum to rotate.

Figure 4:
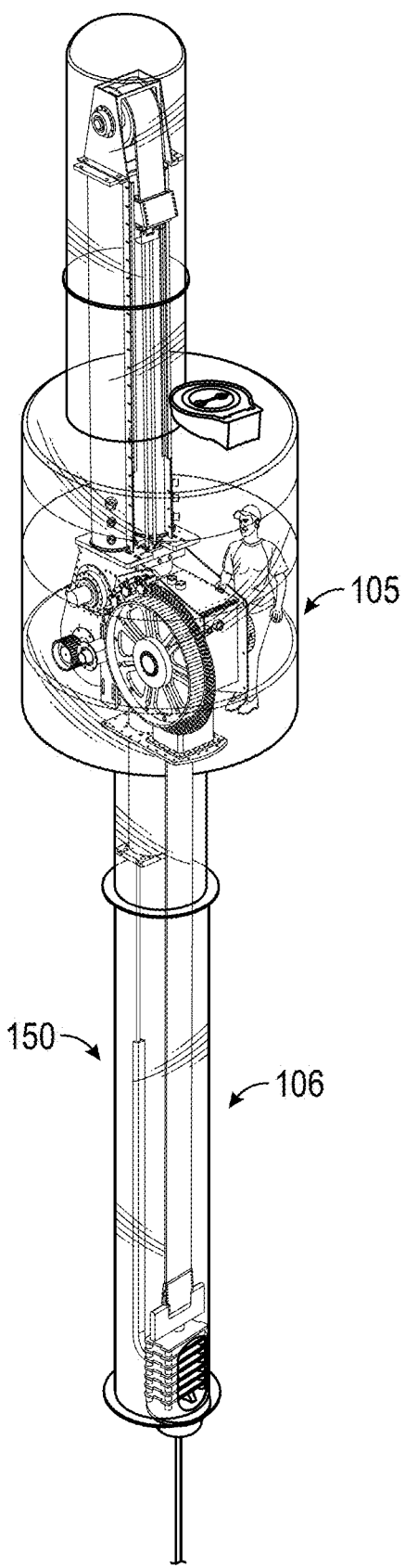
FIG. 4 is directed to another illustration of the wave energy converter device.
Figure 5:
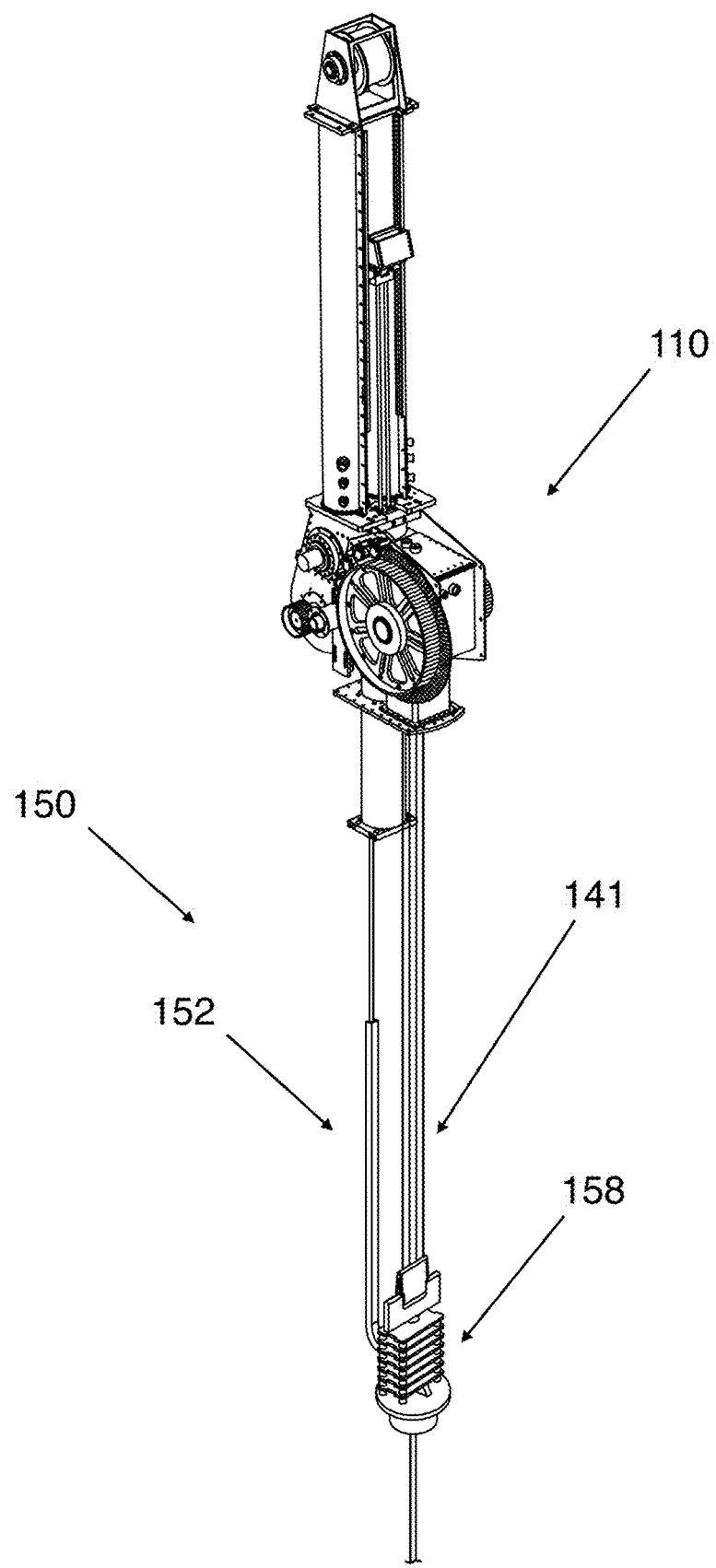
FIG. 5 is directed to another illustration of the wave energy converter device.

With reference now to FIGS. 1, 4, and 5, an exemplary embodiment of a wave energy system 100 is shown. Wave energy system 100 may utilize a control system 101 to control the actuation of the other systems. Control system 101 may have a series of computing devices. Control system 101 may be in the form of a circuit board, a memory, or other non-transient storage medium in which computer-readable coded instructions are stored and one or more processors configured to execute the instructions stored in the memory. Control system 101 may have a wireless transmitter, a wireless receiver, and a related computer process executing on the processors.

Computing devices of control system 101, may be any type of computing device that typically operate under the control of one or more operating systems, which control scheduling of tasks and access to system resources. Computing devices may be a phone, tablet, television, desktop computer, laptop computer, networked router, networked switch, networked, bridge, or any computing device capable of executing instructions with sufficient processor power and memory capacity to perform operations of control system 101.

The one or more computing devices may be integrated into control system 101, while in other non-limiting embodiments, control system 101 may be a remotely located computing device or server configured to communicate with one or more other control systems 101. Control system 101 may also include an internet connection, network connection, and/or other wired or wireless means of communication (e.g., LAN, etc.) to interact with other components. The connection allows for updating, controlling, sending/retrieving information, monitoring, or otherwise interact passively or actively with control system 101.

Control system 101 may include control circuitry and one or more microprocessors or controllers acting as a servo control mechanism capable of receiving input from one or more sensors, analyzing the input from the one or more sensors, and generating an output signal to the various systems. The microprocessors (not shown) may have onboard memory to control the power that is applied to the various systems.

Control system 101 may include circuitry to provide an actuable interface for a user to interact with, including switches and indicators and accompanying circuitry for an electronic control panel or mechanical control panel. Such an actuable interface may present options to select from. Control system 101 may be preprogrammed with any references values, by any combination hardwiring, software, firmware to implement various operational modes including but not limited to temperature, light, and humidity values.

Figure 2:
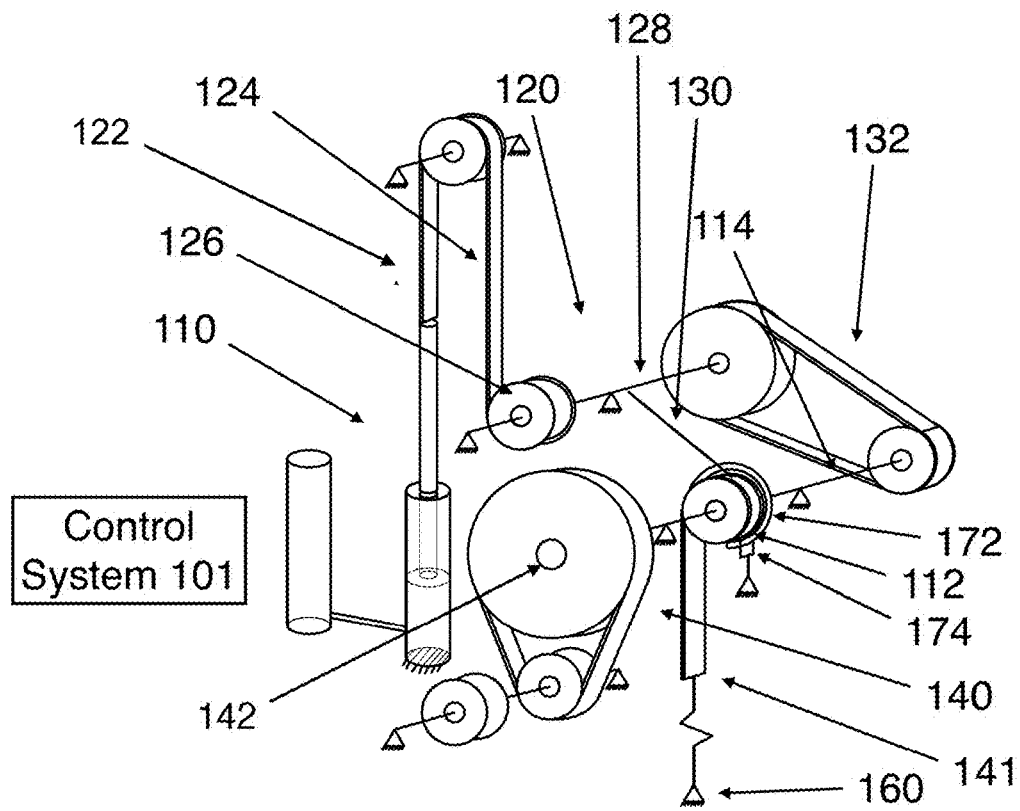
FIG. 2 is directed to an illustration of the components wave energy converter device.
Figure 3:
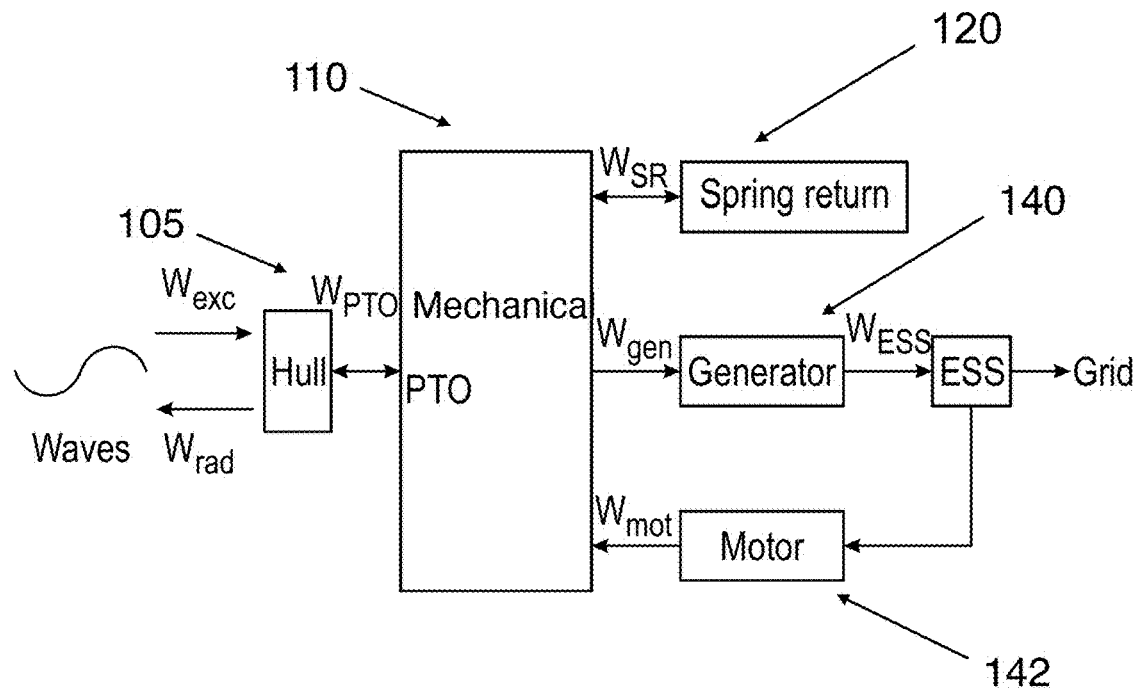
FIG. 3 is directed to an illustration of the energy transfer through the components of the wave energy converter device.

As illustrated in FIGS. 2 and 3, wave energy system 100 may have a power take off (PTO) module or assembly 110. PTO module 110 may include a main PTO drum 112, which may include a power takeoff sheave. Main PTO drum 112 may be affixed to a main PTO drum shaft 114 with rotary seals and supported by bearings in a sealed compartment which is integrated into a support structure around a pneumatic return spring assembly 120 used to provide the restoring force during operation. PTO module 110 may be bolted and sealed into the lower portion of a hull 105 of wave energy system 100.

Pneumatic return spring assembly 120 may have a pneumatic return spring 122 connecting to a spring return belt 124, which passes over a return drum 126 and terminates at the spring return shaft 128. Spring return shaft 128 may be connected to main PTO drum 112 via a synchronous belt 130. Connected in parallel with pneumatic return spring assembly 120 to PTO drum 112 is a second synchronous belt 132, which connects main PTO drum shaft 114 to one or more generators including a generator 140, which is used to generate electrical power.

Generator 140 and main PTO drum shaft 114 are coupled together such that the rotation of main PTO drum shaft 114 causes rotation of a rotor within generator 140. The rotation of the rotor within generator 140 creates the potential for generator 140 to generate electricity by applying an opposing torque to generator 140 through the control system. In this way, the wave energy system 100 utilizes the generator 140 to generate electricity. A brake disc 172 may be affixed to and rotates with main PTO drum 112. One or more brake calipers 174 may be attached to a frame or other component with a series of brake pads that squeezes brake disc 172 for latching type control as well as a service for in-site repairs of the device and PTO.

In one or more embodiments PTO may have a variable stiffness magnetic spring that can be adjusted between a range of positive and negative spring rates. The magnetic spring has a first cylindrical magnetic component and a second cylindrical magnetic component, whereby the first cylindrical magnetic component is coaxial with the second cylindrical magnetic component, whereby the first cylindrical magnetic component is rotatable about an axis and relative to the second cylindrical magnetic component to adjust a stiffness of the variable stiffness magnetic spring, and whereby the second cylindrical magnetic component is translatable along the axis and relative to the first cylindrical magnetic component.

In other embodiments a mechanical coil spring may be connected to the outer rim of a pulley, connected to a shaft, which is coupled to the PTO drum via belt or other means in lieu of the pneumatic spring in some design cases to achieve the pre-tension force.

In one or more embodiments, control system 101 may include a solid-state control system. The solid-state control system includes one or more processors executing software instructions that switch the generator 140 between power generation modes and motoring modes by motor 142 by monitoring the current, the velocity, and the motion of wave energy system 100. The monitoring may be performed, in part, by, but not limited to, a three-axis accelerometer. Control system 101 may be configured to control the instantaneous torque produced by the generator 140 to the power takeoff. By applying torque in a direction opposing the power takeoff motion, power is extracted from the sea waves. By applying torque in the same direction as the power takeoff motion, power is added to the system. Control system 101 efficiently extracts power from any wave condition by constant precise control of the direction and magnitude of the torque applied to the power takeoff.

Because the wave energy system 100 directly drives its generators 140, there are no secondary conversions steps to making electricity. While there are no secondary conversion steps to producing electricity, because wave energy system 100 relies on the ability to drive main PTO drum 112, wave energy system 100 can include an onboard energy storage. The onboard energy storage can include one or more batteries, one or more super capacitors, one or more flywheels, or other kinds of energy storage devices from which energy can be drawn to drive the generator 140.

The core of the control system 101 may be a torque controller for generator 140. The torque controller has a fast and accurate response time so that it can create any commanded torque substantially instantaneously. The torque command sent to the generator is derived based on the current conditions of the sea waves, the parameters of wave energy system 100, and its power takeoff. Control system 101 can also condition the generated power prior to being provided to an external power processor that can then provide generated electricity to the grid.

As illustrated in FIG. 5, main PTO mooring belt 141 terminates at main PTO drum 112 at a first end, while an opposite end of main PTO mooring belt 141 is connected to a guided sliding termination assembly (GSTA) 150 that moves in a vertical linear direction, which allows main PTO mooring belt 141 to terminate and pass loads through the guided sliding termination assembly 150 to an electrical-optical-mechanical (EOM) cable 152 which is connected to the guided sliding termination assembly 150 via a pass thru type connection.

EOM cable 152 passes through and is constrained laterally by a fairlead integrated into lower spar section 106 positioned below hull 105, which then connects at standard dive depths to a buoyant EOM connection assembly 155, which is connected to a second EOM cable 154 that finally connects to the device mooring anchor 160 on the sea floor. A second pass thru type termination allows the electrical and optical part of the EOM cable 152 to continue to a subsea junction box 170 connected to the end user subsea cable 173, which can then proceed to shore to a grid tie connection or be a standalone type which may not be grid tied.

EOM cables 152 and 154 are selected to withstand the saltwater environment in which EOM cables 152 and 154 will be placed. The materials, manufacture, and shape of EOM cables 152 and 154 are selected to resist corrosion by seawater. The characteristics of EOM cables 152 and 154 are also selected to withstand the forces that will be applied to EOM cables 152 and 154 from torque applied to the main PTO drum 112 by the generator 140 during motoring phases. The EOM cables 152 and 154 may include one or more of a rope, a chain, or a cable. In some non-limiting embodiments, EOM cables 152 and 154 may have their equilibrium position in the water column adjusted so that the maximum travel is available within the PTO regardless of the water depth.

A motorized mechanism may drive the movement of EOM cables 152 and 154, altering its equilibrium position whereby motorized mechanism may be attached to EOM cables 152 and 154 by any number of fasteners. It may include an electric or mechanical motor, gears, pulleys, or any suitable mechanism capable of producing controlled linear or rotational motion. The motor may be connected to control system 101 to regulate the operation of the motorized mechanism. Control system 101 may also include additional features, such as an LCD display or indicator lights, to provide information about the current settings and operation of the system.

In the event of a large storm, GSTA 150 may also engage an attenuator 158, or emergency end stop, at the bottom of the device stroke, which passes loads from the EOM cable 152 directly to the hull structure 105, eliminating these high loads from passing to PTO module 110.

Figure 7:
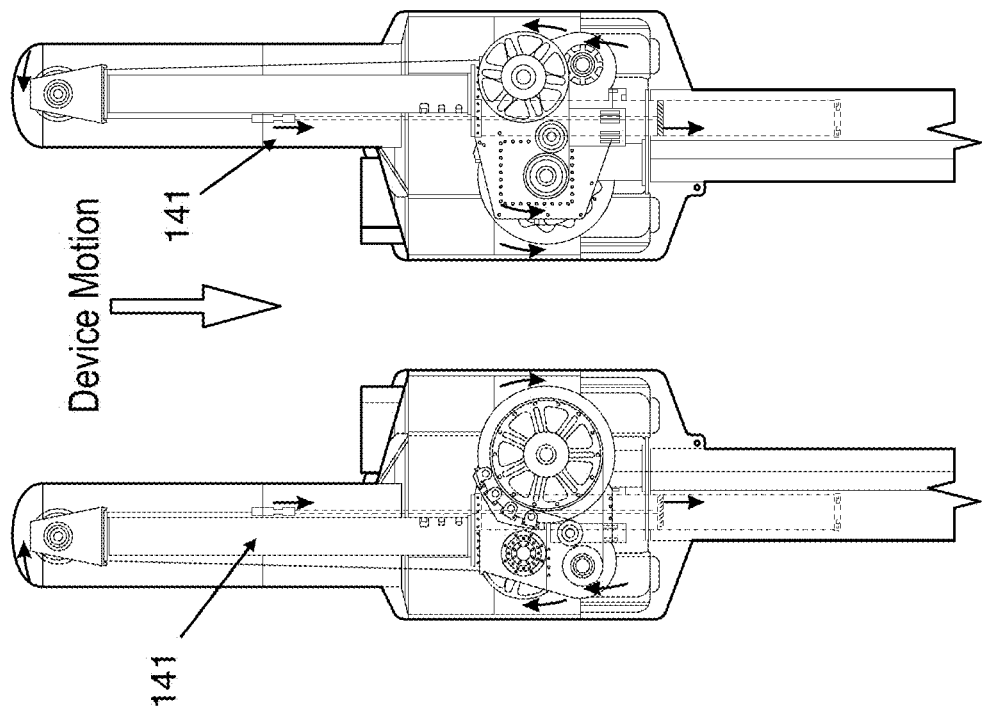
Figure 6:
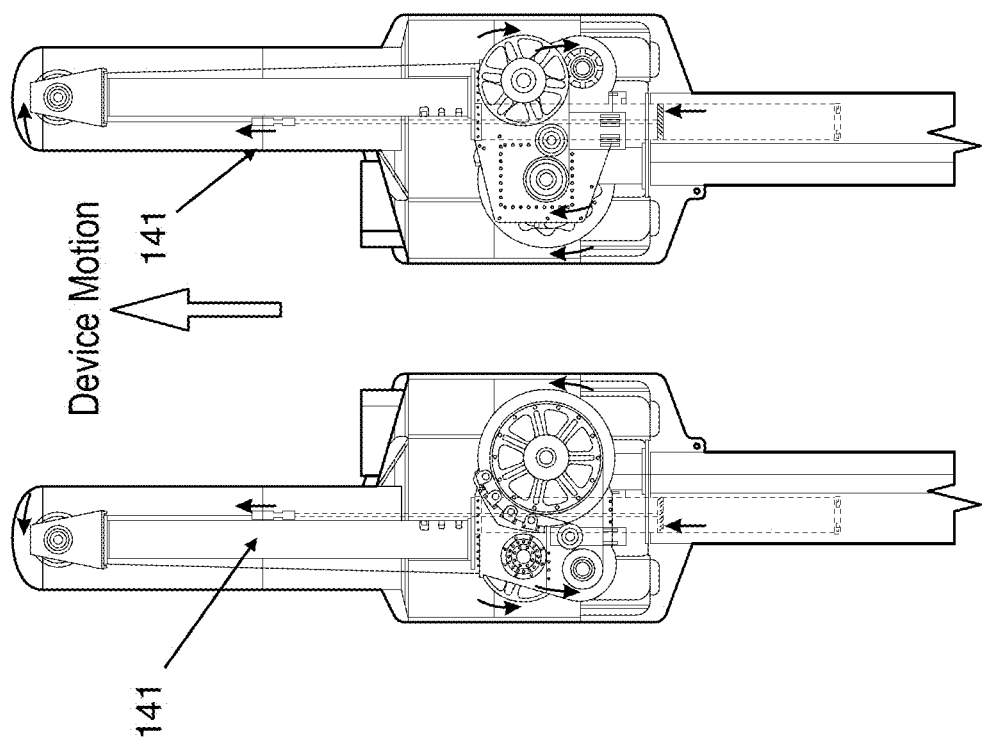
FIG. 6 is directed to an illustration of the direction conventions of the PTO mooring line out.

As illustrated in FIGS. 6 and 7, wave energy system 100 is free-floating in 6 degrees of freedom and generates power in the heave degrees of freedom, with some power generated in the surge & sway components of the motion of wave energy system 100. Wave energy system 100 is designed to produce power primarily on the rise of the wave by generating high tensile forces in the main PTO mooring belt 141 between wave energy system 100 and device mooring anchor 160, which rotates PTO sheave in its bearings and main PTO drum 112 and produces high torque, low RPM power at PTO shaft 114, and is stepped up via the synchronous gear drive to generator 140, as well as storing energy in pneumatic spring assembly system 120. On the fall of the wave, energy system 100 operates in a PTO "motoring" condition by a combination of releasing energy stored in the pneumatic return spring system 120 and powering generator 140 as a motor in the opposite direction to return wave energy system 100 to its home position at the bottom of the wave by reeling in main PTO mooring belt 141. The power production cycle is then restarted.

Control system 101 may be utilized to produce a consistent output to a local power grid and to store power for use in the motoring of wave energy system 100 during the non-power-producing part of the wave cycle. In one embodiment, the output of the generator 140 is first rectified into DC. A solid-state switch operating at variable duty cycle controls the output current, influencing the generator torque and therefore damping of the system. The energy output by the generator 140 is stored in an ultracapacitor appropriate for the high capacity, rapid, and numerous charge/discharge cycles. The voltage of the capacitor bus will vary with the amount of energy currently stored. In one embodiment, a DC to DC converter is used to convert the capacitor bus voltage to a consistent intermediate storage voltage.

A battery may be inserted at this stage to provide consistent and reliable power in case of periods of no wave energy capture. This intermediate storage bus powers a motor drive used to run the generators as motors to cause wave energy system 100 to return to its home position at the bottom of a sea swell, and re-start the power production cycle. In one embodiment, the final converter stage boosts the intermediate bus voltage to a final output voltage. This part of the design is independent from the rest of the power electronics and would be designed to create an output voltage appropriate for the power consumer, which could be a grid connection or an offshore energy consumer.

In the case of a small energy consumer, AC output voltage may be most efficient overall. For a typical connection to a large grid, high voltage DC will likely be the most appropriate form of electricity transmission. A high voltage inverter at the nearest utility substation would convert the high voltage DC for grid interconnect. In one embodiment, all of the power electronics currently exist in industrial operation.

Figure 8:
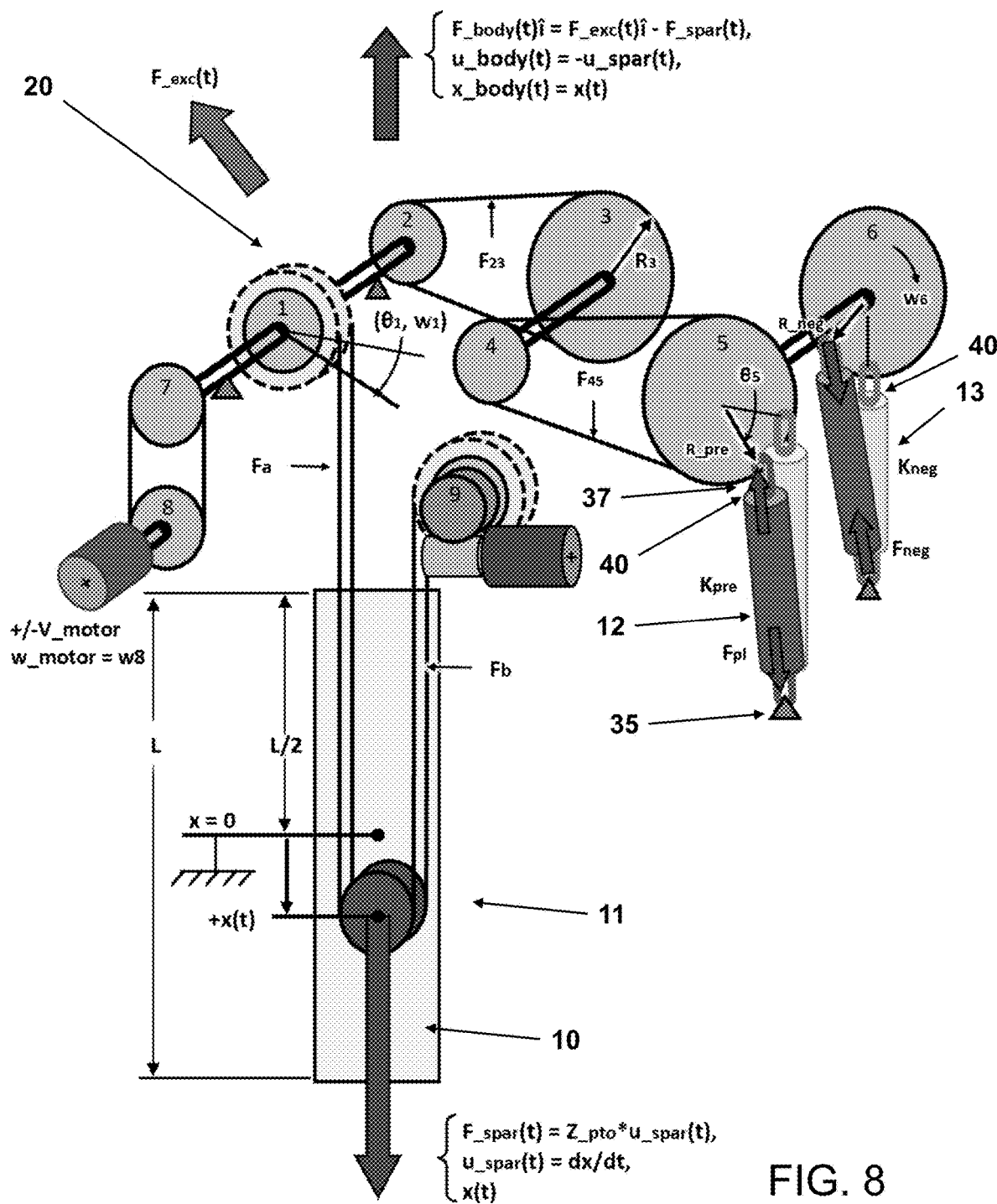
FIG. 8 show another illustration of an embodiment of the return spring.
Figure 9:
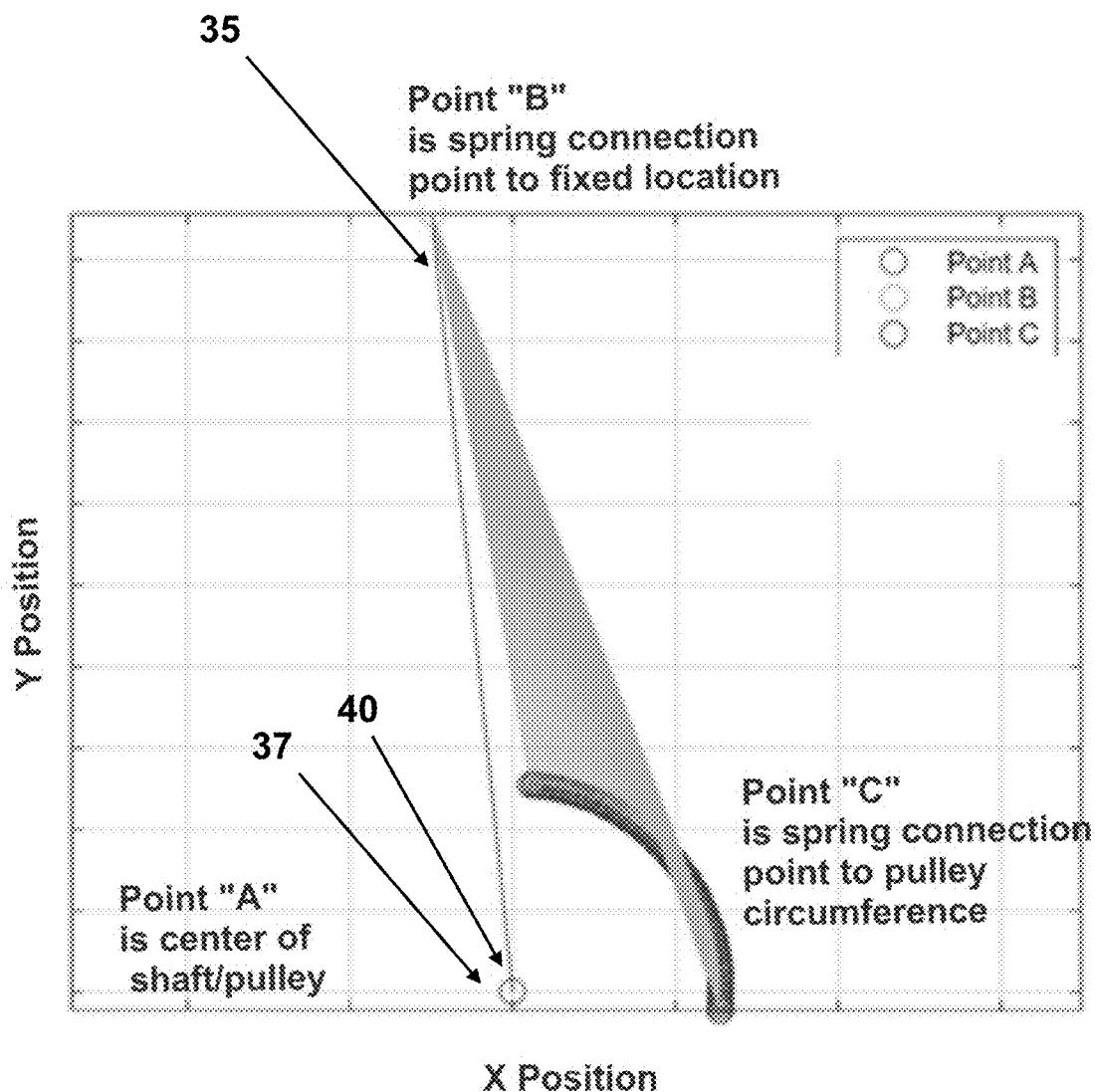
FIG. 9 illustrates Geometry of linear spring connection to circumference of spring return pulley or crank arm.
Figure 10:
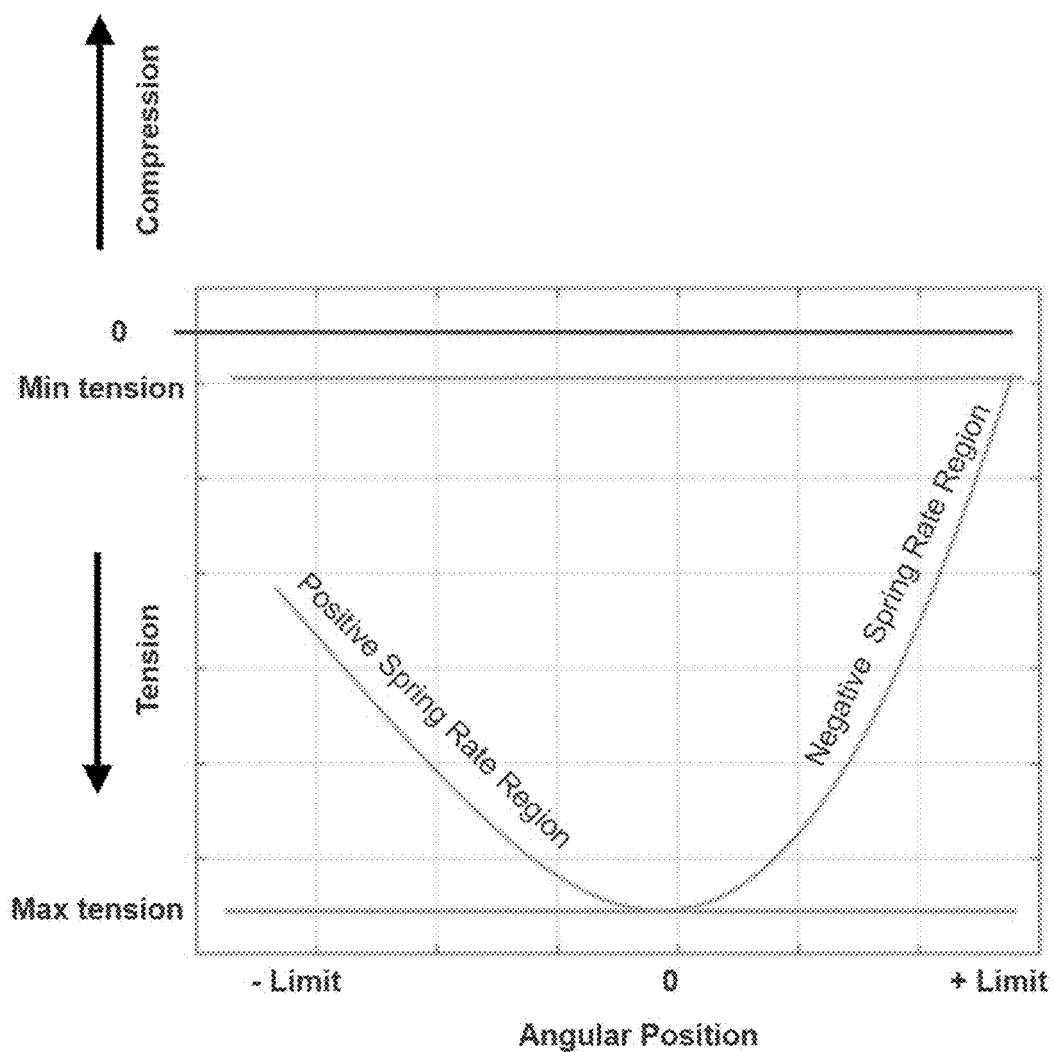
FIG. 10 illustrates Position vs. mooring line tension/PTO drum torque for total PTO displacement range.
Figure 11:
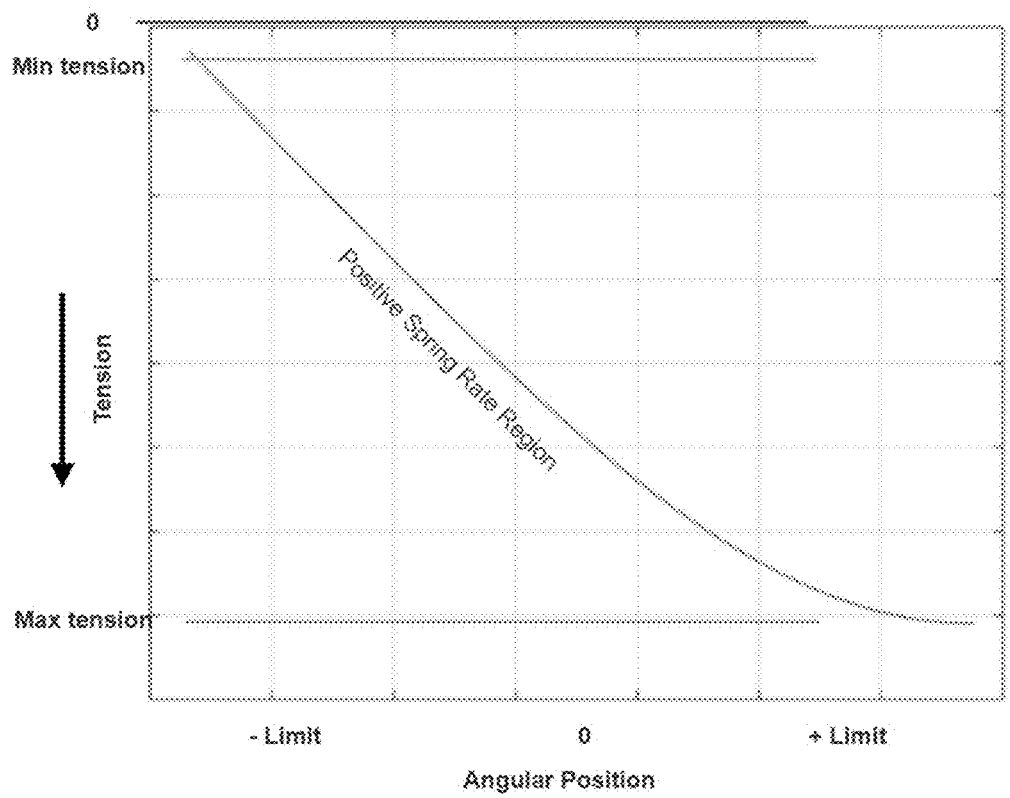
FIG. 11 illustrates Position vs. mooring line tension/PTO drum torque for positive spring rate region.
Figure 12:
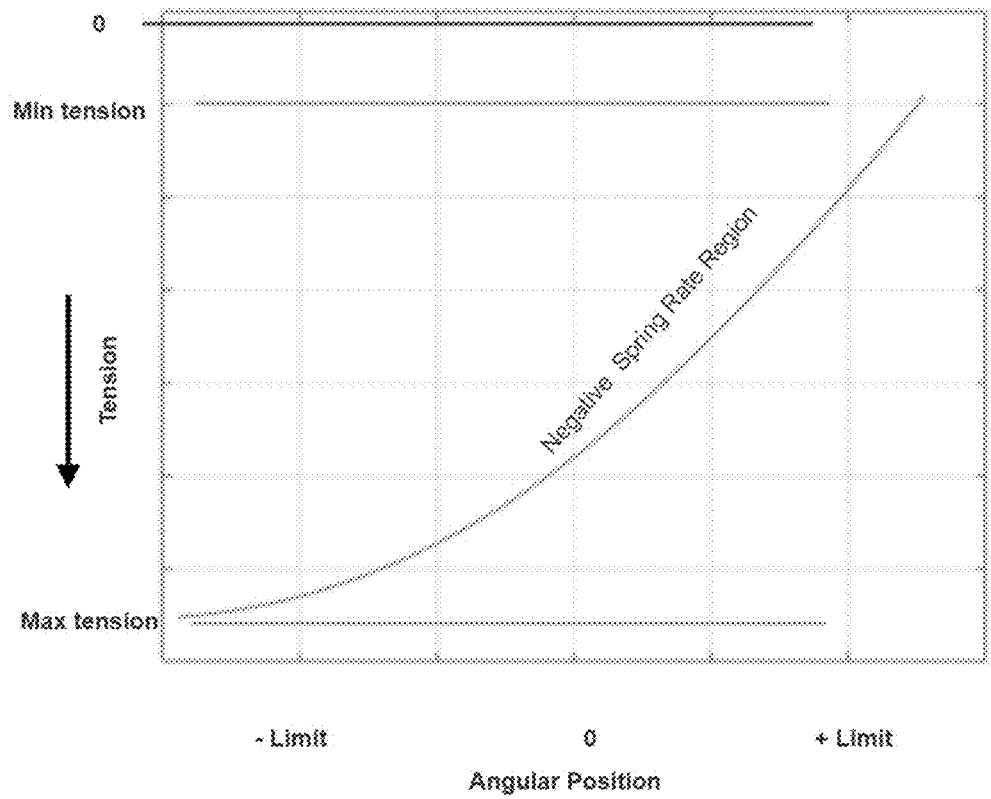
FIG. 12 illustrates Position vs. mooring line tension/PTO drum torque for negative spring rate region
Figure 13:
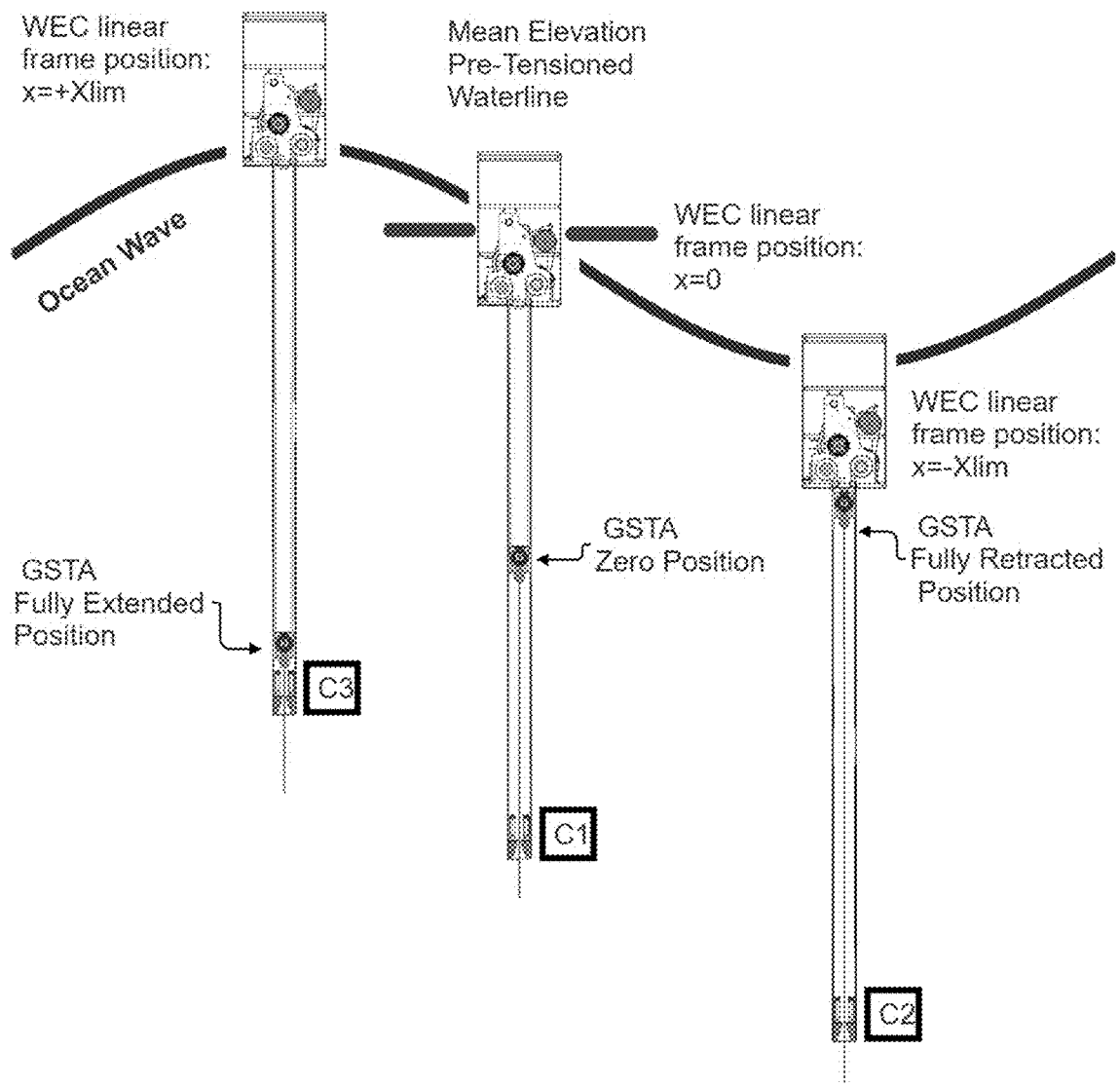
FIG. 13 illustrates reference conventions for deployed buoy/WEC showing GSTA position vs ocean wave displacement.

In one or more non-limiting embodiments, as illustrated in FIG. 8-13, the invention may include a magnetic return spring system 20 that involves one or multiple return springs 12, 13 attached at one end to the circumference of the return spring shaft pulley 5,6 (point "C") or sprocket or alternatively a crank arm via a rotating bearing at a first end 35 and at the other end 37 is connected to a rotating bearing 40 at (point "B"). The geometry is configured in such a way as to create a torque on the shaft that while the spring displacement in the linear frame is a linear positive rate spring, the torque profile is a curve that has regions of positive and negative spring rate, and resolve to tension on the mooring line. The operating region is set so that the mooring line always has tension and never operates with less than the minimum tension on the curve, and never in a compressive region. FIG. 8 also illustrates a Spring Return Sprocket/Pulley 2, a Spring Return Sprocket/Pulley 3, a Spring Return Drive Sprocket/Pulley 4, a Generator Sprocket/Pulley 7, a Generator Sprocket/Pulley 8, a Guided Sliding Termination 10, and a Guided Sliding Termination Pulley 11.

The PTO mooring belt is two-parted in this configuration with the PTO belt leaving the PTO drum 1 and then wrapping around a pulley 11 and then connects to a second drum adjacent to the first at 9. The drum is connected to a gearbox with a motor. By adjusting the position of the drum 9, the region of operation may be manipulated to be either positive or negative spring, or the center of the torque/tension profile curve. The pulley 11 may also be used for tidal-compensation, that is, by adjusting its position the middle position of the PTO operating range can be adjusted as the physical tides changes for the buoy pre-tensioned waterline. This topology also has the advantage of reducing loads to the PTO by a factor of 2 via two-parting the line, and also increasing the input velocity to pulley 11 by a factor of 2. This means the overall gearing in the system can be reduced to the generator and the spring return system, and the PTO belt can be physically smaller due to the lower loads.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A wave energy system comprising:
a generator;
a power takeoff drum coupled to the generator; and
a magnetic return spring assembly having a return spring connecting to a spring return belt, which passes over a return drum and terminates at a spring return shaft, wherein the spring return shaft is connected to the power takeoff drum via a synchronous belt.

2. The wave energy system of claim 1, further comprising a guided sliding termination assembly connected to an electrical-optical-mechanical cable which is connected to the guided sliding termination assembly via a pass thru type connection.

3. A wave energy system comprising: a return spring system including a return spring shaft pulley, at least one spring having a first end and a second end, wherein the first end is attached to a circumference of the return spring shaft pulley at a first point via a first rotating bearing; wherein the second end is connected to a second rotating bearing at a second point; wherein the system creates a torque profile having regions of positive and negative spring rates while maintaining linear spring displacement; and wherein the wave energy system maintains a minimum tension on a mooring line.

4. The wave energy system of claim 3, further comprising: a power take-off (PTO) drum; a PTO mooring belt configured in a two-part arrangement; wherein the PTO mooring belt extends from the PTO drum, wraps around a pulley, and connects to a second drum adjacent to the PTO drum.

* * * * *